United States Patent [19]

Russell et al.

[11] Patent Number: 4,774,834
[45] Date of Patent: Oct. 4, 1988

[54] ENGINE SENSORS

[75] Inventors: Michael F. Russell, Buckinghamshire; Russell A. Bruce, Middlesex; John H. Moore, Glouchester, all of England

[73] Assignee: Lucas Industries Public Limited Company, Birmingham, England

[21] Appl. No.: 97,954

[22] Filed: Sep. 17, 1987

[30] Foreign Application Priority Data

Sep. 20, 1986 [GB] United Kingdom ............... 8622723

[51] Int. Cl.⁴ .......................................... G01M 15/00
[52] U.S. Cl. .................................................. 73/119 A
[58] Field of Search ................... 73/117.3, 116, 118.1, 73/119 A; 123/145 A

[56] References Cited

U.S. PATENT DOCUMENTS 4,463,729  8/1984  Bullis et al. ............... 73/117.3 X Primary Examiner—Jerry W. Myracle
Attorney, Agent, or Firm—Balogh, Osann, Kramer, Dvorak, Genova & Traub

[57] ABSTRACT

An engine sensor includes a radiation response element which in use is coupled by a radiation transmission path with a combustion chamber of an internal combustion engine so that a signal is provided when combustion occurs in the combustion chamber. The radiation transmitting path is incorporated into a component such as an engine starting aid which is mounted in a bore in the cylinder head of the engine. In the sample a quartz rod is locating in a tubular member about which is wound an electric heating element. The quartz rod can transmit light through a powdered glass filling to a through quartz rod at the end of which is mounted the sensing element.

9 Claims, 1 Drawing Sheet

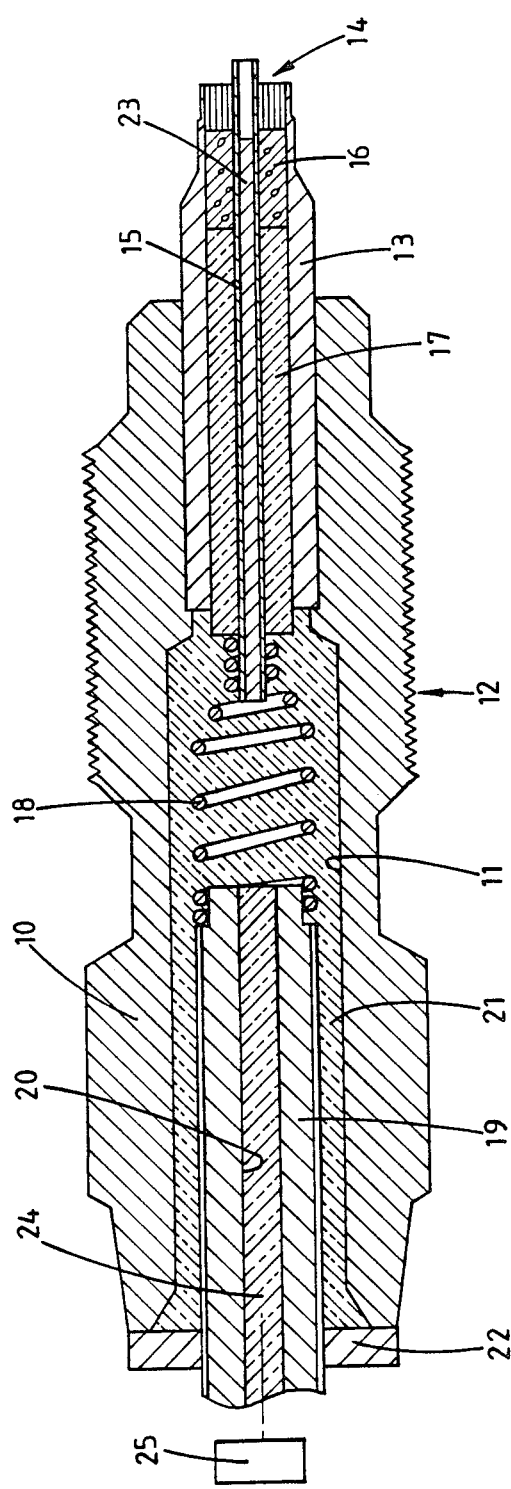

ENGINE SENSORS

This invention relates to sensors for use in internal combustion engines more particularly but not exclusively compression ignition engines, the sensor being used to provide a signal indicative of the start of combustion of fuel in a combustion space of the engine, the signal provided by the sensor being utilised in a control system to control the operation of the engine.

As an example the sensor may comprise a body which is secured within a suitable bore in the cylinder head of the engine and may incorporate an electromagnetic radiation transmitting rod the end of which is exposed within the combustion space, the rod acting to transmit radiation which is generated when combustion of fuel takes place, to a remote position either within or external of the sensor body at which is located a light responsive device which produces an electrical signal in response to the transmitted radiation. Although the term radiation is used it is to be understood that in general the device will be responsive to visible light but may for example, be responsive to infra-red. The signal is supplied to the control system of the engine and may be used to alter the timing of delivery of fuel in the case of a compression ignition engine or the spark timing in the case of a spark ignition engine.

The use of the sensor requires the provision of a bore in the cylinder head of the engine and this adds to the cost of the engine and in addition, it is not always easy to find a space for the sensor among the valves and spark plug in the case of a spark ignition engine and the valves, injection nozzle and a starting aid, in the case of a compression ignition engine bearing in mind the need also to provide adequate coolant passages within the cylinder head.

The object of the invention is to provide an engine sensor in a convenient form.

According to the invention a sensor for the purpose specified is combined with a component of an internal combustion engine which in use is secured within a bore in the cylinder head of the engine and which has its inner end exposed to the combustion space of the engine, the sensor including a radiation responsive element and the component defining a radiation transmitting path extending from said inner end of the component to said radiation responsive element.

An example of an engine sensor in accordance with the invention will now be described with reference to the accompanying drawing which is a sectional side elevation.

In the accompanying drawing the sensor is combined with a starting aid for a compression ignition engine and it comprises a body part 10 in which is formed a stepped bore 11. The body is screw threaded at 12 so that it may be secured within a complementarily threaded bore formed in the cylinder head of a compression ignition engine. Mounted within the narrower end of the bore is a metallic tube 13 which projects from the bore 11 and within the end of which is mounted a spirally wound electric heating element 14. The element is wound about a centrally disposed tube 15 which is formed from metal and the element itself is formed from metallic tape which prior to being wound to spiral form, is coated with electrical insulation material. The tube 15 extends beyond the heating element. The inner end of the heating element is electrically connected to the tube 15 and the outer end of the heating element is electrically connected to the tube 13 which in turn is electrically connected to the body 10. The connection is effected by turning the end portion of the tape through 90° and securing the tape to the tube 13 at a position remote from the end of the tube.

Adjacent the element there is located a ceramic plug or plugs 16 and adjacent the plug is a fused glass filling 17 which projects slightly from the inner end of the tube 13 and which supports the tube 15 in insulating relationship within the tube 13. The filing is formed by fusing in situ, a plurality of glass preforms.

The tube 15 extends beyond the end of the filling 17 and is electrically connected by means of a helical resistance element 18, to an electrically conductive rod 19 which is provided with a central bore 20. The rod and the resistance element 18 are held in insulating relationship within the wider part of the bore 11 by means of a further fused glass filling 21 and the end of the bore 11 is sealed by an insulating member 22.

The portion of the device so far described forms a starting aid for assisting the starting of the engine and in use, the rod 19 is connected to one terminal of a source of electric supply the other terminal of which is connected to the body 10 by way of the engine structure. When so connected the heating element becomes heated to form a hot surface within the combustion chamber of the engine so as to assist the starting of the engine. The resistance element 18 acts to control the current flowing in the heating element.

Mounted within the tube 15 is a quartz rod 23 the end of which adjacent the heating element, is spaced inwardly from the end of the ceramic plug 16. The rod 23 extends to the end of the tubular member which is surrounded by the filling 21 and it is conveniently sealed within the tube 15 by means of a lining formed from silicone rubber. The lining besides providing the retaining and sealing action, also acts to cushion the fragile rod against vibration generated when the engine is in operation and it also serves to damp any vibrations which may occur in the rod.

In the electrically conductive rod 19 there is located in the particular example, a further quartz rod 24 the inner end of which is exposed to the filling 21 and the outer end of which is exposed to a radiation sensing element 25 which delivers an electrical signal when light is transmitted to it by way of the rod 24. In operation, when combustion of fuel takes place in the combustion chamber, light is generated a portion of which is transmitted along the rod 23, through the filling 21 and along the rod 24 to the sensing element 25 which then produces an electrical signal. The signal can be utilised in a control system for the engine, as an indication of when combustion of fuel takes place and it is possible using this signal, to adjust the timing of fuel delivery to the combustion space so that the start of combustion of fuel takes place at the appropriate position in the engine cycle. The process of combustion in a compression ignition engine starts to emit light in small quantities during the so-called ignition delay period, the amount of light increasing at the point of ignition of the main portion of the fuel. As soon as true ignition takes place carbon particles are formed which are raised to incandescence so that large quantities of visible and infra-red radiation are produced. It is therefore to be understood that the term "light" is also to include the non-visible portions of the spectrum. The aforesaid rods 23, 24 can be formed from silicon.

Using the arrangement described it is possible to obtain a signal indicative of the start of combustion of fuel without the need to provide a further bore in the cylinder head of the engine.

The sensing element 25 can be mounted at the end of the rod 19 but it must be remembered that the rod 19 also has to be connected to a source of electrical supply.

It is possible to mount the sensing element in alternative positions. For example, it is possible to mount the sensing element in or on the wall of the body part 10 so that it responds to the light transmitted through the fused glass filling 21 in which case the rod 24 is omitted and the conductive rod 19 is solid. In this case the body part is provided with an aperture in which the element is mounted or through which the light passes to the element. In order to increase the sensitivity of the element the end of the rod 19 can be oblique so that light is reflected towards the element. Instead of shaping the rod the resistance element can be provided with a surface finish so as to increase the amount of light falling on the element. An alternative position for the sensing element can be on the insulating member 22 which may be formed from or incorporate a glass insert, and in this case the inner end of the rod 23 may be inclined to deflect the light emanating from the rod 15 towards the sensing device. It is also possible to utilise the fused filling 17 to conduct the light. In this case the tube 15 together with the quartz rod 23 terminate just beyond the end of the plug 16 remote from the element. An electrical connection to the tube 15 is achieved using a connecting member which is welded or otherwise secured to the projecting portion of the tube 15 which projects from the plug 16, the connecting member being mounted in offset relationship within the tube 13. It is also possible to mount the sensing element on the structure of the engine with the light being transmitted to the element by means of a fibre optic cable.

The arrangements above described have the advantage that any carbon tending to deposit on the end of the quartz rod 23 which is exposed to the combustion chamber, will be burnt off when the starting aid is in use thereby avoiding the problem of a diminishing signal due to carbon formation, as the sensor is used.

As an alternative to providing the rod 23 within the tube 15 there may be provided an oblique aperture in the tube 13, the outer end of the aperture being exposed in use to the combustion space of the engine. Mounted in the aperture is a quartz rod which extends to the fused glass filling 17. In so doing the rod may have to pass through the region of the tube 13 occupied by the ceramic plug or plugs 16. In this case the plug or plugs are shaped to accommodate the rod.

As a further alternative the quartz rod may be replaced by a sleeve formed from quartz and which locates about the element 14 and the plug or plugs 16.

The sensor may be incorporated into a starting aid of the type in which the heating element is located within a thin-walled metal tube being supported within the tube by mineral insulation and with the end of the tube closed. In this case the quartz rod would again be supported within a metal tube but in this case the tube would not form a path for the electric current flowing to the heating element. Once again this arrangement will have the advantage that carbon deposit on the end of the quartz rod can be minimised.

Although quartz and silicon have been mentioned as light transmitting materials, it will be understood that other materials may be used depending upon the portion of the spectrum which is to be observed.

Although not having the advantages of the self-cleaning effect, it is possible to incorporate the sensor into a sparking plug for a spark ignition engine.

The radiation sensing element 25 will provide a signal which increases rapidly as combustion of fuel takes place and the signal processing circuits are arranged to provide a signal indicative of the start of combustion at say 6% of the peak value of the signal from the device.

The signal provided by the sensing element 25 can be used to provide an estimate of the fuel/air ratio within the cylinder. This is achieved by comparing the tail of the signal produced by the sensing element with a stored signal and the colour temperature may be used to determine the amount of fuel burned in the cylinder.

We claim:

1. A sensor for use in an internal combustion engine more particularly but not exclusively a compression ignition engine, the sensor being combined with a component of the engine which in use is secured within a bore in the cylinder head of the engine and has its inner end exposed to a combustion space of the engine, the sensor including a radiation responsive element and the component defining a radiation transmitting path extending from said inner end of the component to said radiation responsive element, wherein said component is an electrically powered starting aid for the engine, in which the starting aid includes a spirally wound heating element, the element being wound about an electrically conductive tube, and a radiation conducting rod mounted in said tube, said rod forming part of said radiation transmitting path.

2. A sensor according to claim 1 in which the radiation conductive rod terminates short of the end of the tube which is exposed in use, to the combination chamber.

3. A sensor according to claim 2 in which said tube extends beyond the end of the second element which in use, is presented to the combustion chamber.

4. A sensor according to claim 3 in which said element is mounted within a metallic tube which is supported in one end of a tubular body part, an electrically conductive rod extending into the opposite end of the body part, means electrically connecting the electrically conductive rod with said first mentioned tube, and a glass filling which locates the conductive rod and said means within the body part at least a part of said filling forming part of said radiation transmitting path.

5. A sensor according to claim 2 in which said element is mounted within a metallic tube which is supported in one end of a tubular body part, an electrically conductive rod extending into the opposite end of the body part, means electrically connecting the electrically conductive rod with said first mentioned tube, and a glass filling which locates the conductive rod and said means within the body part at least a part of said filling forming part of said radiation transmitting path.

6. A sensor according to claim 5 in which said first mentioned tube is supported in said metallic tube by a fused glass filling, said fused glass filling forming a further part of said radiation transmitting path and acting to transmit the radiation between said radiation conductive rod and said glass filling.

7. A sensor according to claim 5 in which said first mentioned tube extends into said glass filling.

8. A sensor according to claim 5 in which said electrically conductive rod is hollow and carries a radiation transmitting rod which is exposed to the glass filling, said sensing element being responsive to the radiation transmitted through said rod.

9. A sensor according to claim 5 in which said sensing element is mounted on said body part and is responsive to the radiation transmitted by said glass filling.

* * * * *